(12) United States Patent
Singh et al.

(10) Patent No.: US 9,934,329 B2
(45) Date of Patent: *Apr. 3, 2018

(54) COMPOSITE TERM INDEX FOR GRAPH DATA

(71) Applicant: Facebook, Inc., Menlo Park, CA (US)

(72) Inventors: Sanjeev Singh, San Jose, CA (US); Bret Steven Taylor, Los Gatos, CA (US); Paul Buchheit, Los Altos, CA (US); James Norris, Mountain View, CA (US); Tudor Bosman, Pleasanton, CA (US); Benjamin Darnell, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,031

(22) Filed: Feb. 9, 2017

(65) Prior Publication Data

US 2017/0154124 A1 Jun. 1, 2017

Related U.S. Application Data

(63) Continuation of application No. 14/925,803, filed on Oct. 28, 2015, now Pat. No. 9,576,060, which is a continuation of application No. 14/017,153, filed on Sep. 3, 2013, now Pat. No. 9,223,899, which is a
(Continued)

(51) Int. Cl.
*G06F 17/30* (2006.01)

(52) U.S. Cl.
CPC .. *G06F 17/30958* (2013.01); *G06F 17/30424* (2013.01); *G06F 17/30477* (2013.01); *G06F 17/30528* (2013.01); *G06F 17/30554* (2013.01); *G06F 17/30619* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,526,486 B2 | 4/2009 | Cushman, II et al. | |
| 8,185,558 B1 * | 5/2012 | Narayanan | G06F 17/30958 707/798 |

(Continued)

FOREIGN PATENT DOCUMENTS

CN 101770459 A 7/2010

OTHER PUBLICATIONS

Harth, et al., "Optimized Index Structures for Querying RDF from the Web", pp. 1-10, Dec. 31, 2005.
(Continued)

*Primary Examiner* — Debbie Le
(74) *Attorney, Agent, or Firm* — Baker Botts L.L.P.

(57) ABSTRACT

This application is directed to an indexing system for graph data. In particular implementations, the indexing system uses a database index infrastructure that provides for flexible search capability to data objects and associations between data objects. Particular embodiments relate to an indexing system for storing and serving information modeled as a graph that includes nodes and edges that define associations or relationships between nodes that the edges connect in the graph.

20 Claims, 2 Drawing Sheets

Related U.S. Application Data continuation of application No. 13/228,312, filed on Sep. 8, 2011, now Pat. No. 8,527,497.

(60) Provisional application No. 61/428,615, filed on Dec. 30, 2010.

(56) References Cited

U.S. PATENT DOCUMENTS

| | | | | |
|---|---|---|---|---|
| 8,239,364 | B2 * | 8/2012 | Wable | G06F 17/30867 |
| | | | | 707/706 |
| 8,527,497 | B2 * | 9/2013 | Singh | G06F 17/30867 |
| | | | | 707/707 |
| 8,572,129 | B1 * | 10/2013 | Lee | G06Q 50/01 |
| | | | | 707/798 |
| 9,223,899 | B2 * | 12/2015 | Singh | G06F 17/30867 |
| 9,514,245 | B2 * | 12/2016 | Venkataramani | G06F 17/3048 |
| 9,576,060 | B2 * | 2/2017 | Singh | G06F 17/30867 |
| 2011/0137902 | A1 * | 6/2011 | Wable | G06F 17/30867 |
| | | | | 707/737 |

OTHER PUBLICATIONS

Notification of the First Office Action received from the People's Republic of China, for Chinese Patent Application No. 2017102191331, dated Nov. 23, 2017.

\* cited by examiner

COMPOSITE TERM INDEX FOR GRAPH DATA

PRIORITY

This application is a continuation under 35 U.S.C. § 120 of U.S. patent application Ser. No. 14/925,803, filed 28 Oct. 2015, which is a continuation of U.S. patent application Ser. No. 14/017,153, filed 3 Sep. 2013, now U.S. Pat. No. 9,223,899, which is a continuation under 35 U.S.C. § 120 of U.S. patent application Ser. No. 13/228,312, filed 8 Sep. 2011, now U.S. Pat. No. 8,527,497, which claims the benefit under 35 U.S.C. § 119(e) of U.S. Provisional Patent Application No. 61/428,615 filed 30 Dec. 2010, each of which is incorporated herein by reference.

TECHNICAL FIELD

The present disclosure generally relates to databases and, more particularly, to a data indexing system for graph data structures.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view web pages created or customized by other users where visibility and interaction with such pages by other users is governed by some characteristic set of rules.

Such social networking information, and most information in general, is typically stored in relational databases. Generally, a relational database is a collection of relations (frequently referred to as tables). Relational databases use a set of mathematical terms, which may use Structured Query Language (SQL) database terminology. For example, a relation may be defined as a set of tuples that have the same attributes. A tuple usually represents an object and information about that object. A relation is usually described as a table, which is organized into rows and columns. Generally, all the data referenced by an attribute are in the same domain and conform to the same constraints.

The relational model specifies that the tuples of a relation have no specific order and that the tuples, in turn, impose no order on the attributes. Applications access data by specifying queries, which use operations to identify tuples, identify attributes, and to combine relations. Relations can be modified and new tuples can supply explicit values or be derived from a query. Similarly, queries identify may tuples for updating or deleting. It is necessary for each tuple of a relation to be uniquely identifiable by some combination (one or more) of its attribute values. This combination is referred to as the primary key. In a relational database, all data are stored and accessed via relations. Relations that store data are typically implemented with or referred to as tables.

Relational databases, as implemented in relational database management systems, have become a predominant choice for the storage of information in databases used for, for example, financial records, manufacturing and logistical information, personnel data, and other applications. As computer power has increased, the inefficiencies of relational databases, which made them impractical in earlier times, have been outweighed by their ease of use for conventional applications. The three leading open source implementations are MySQL, PostgreSQL, and SQLite. MySQL is a relational database management system (RDBMS) that runs as a server providing multi-user access to a number of databases. The "M" in the acronym of the popular LAMP software stack refers to MySQL. Its popularity for use with web applications is closely tied to the popularity of PHP (the "P" in LAMP). Several high-traffic web sites use MySQL for data storage and logging of user data.

A database index is a data structure that improves the speed of data retrieval operations on a database table. A database index can be created using one or more columns of a database table, providing the basis for both rapid random lookups and efficient access of ordered records. The disk space required to store the index is typically less than that required by the table (since indexes usually contain only the key-fields according to which the table is to be arranged, and exclude all the other details in the table), yielding the possibility to store indexes in memory for a table whose data is too large to store in memory. Indexes can be implemented using a variety of data structures. Popular indexes include balanced trees, B+trees and hashes.

A graph is an abstract representation of a set of objects where at least some pairs of the objects are connected by links. The interconnected objects are commonly referred to as nodes, and the links that connect nodes are called edges. Modeling data in a graph structure, however, imposes challenges to scalability and performance. Queries that require traversal of a graph structure may require many database lookups. Highly scalable systems typically rely on caching and indexing to improve query response times and overall performance.

SUMMARY OF PARTICULAR EMBODIMENTS

The present invention provides methods, apparatuses and systems directed to an indexing system for graph data. In particular implementations, the indexing system provides for denormalization and replica index functionality to improve query performance. These and other features, aspects, and advantages of the disclosure are described in more detail below in the detailed description and in conjunction with the following figures.

DESCRIPTION OF EXAMPLE EMBODIMENTS

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In particular implementations, the present invention is directed to a database index infrastructure that provides for flexible search capability to data objects and associations between data objects. Particular embodiments relate to an indexing system for storing and serving information modeled as a graph that includes nodes and edges that define associations or relationships between nodes that the edges connect in the graph. In particular embodiments, the graph is, or includes, a social graph, and the indexing system is part of a larger networking system, infrastructure, or platform that enables an integrated social network environment. In the present disclosure, the social network environment may be described in terms of a social graph including social graph information. In fact, particular embodiments of the present disclosure rely on, exploit, or make use of the fact that most or all of the data stored by or for the social network environment can be represented as a social graph. Particular embodiments provide a cost-effective infrastructure that can efficiently, intelligently, and successfully scale with the exponentially increasing number of users of the social network environment such as that described herein.

In particular embodiments, the distributed indexing system and backend infrastructure described herein provides one or more of: low latency at scale, a lower cost per request, an easy to use framework for developers, an infrastructure that enables combined queries involving both associations (edges) and objects (nodes) of a social graph as described by way of example herein, an infrastructure that provides a flexible and expressive query model for stored objects and associations, and an infrastructure that is easy to call directly from PHP. Additionally, as used herein, "or" may imply "and" as well as "or;" that is, "or" does not necessarily preclude "and," unless explicitly stated or implicitly implied.

Figure 3:
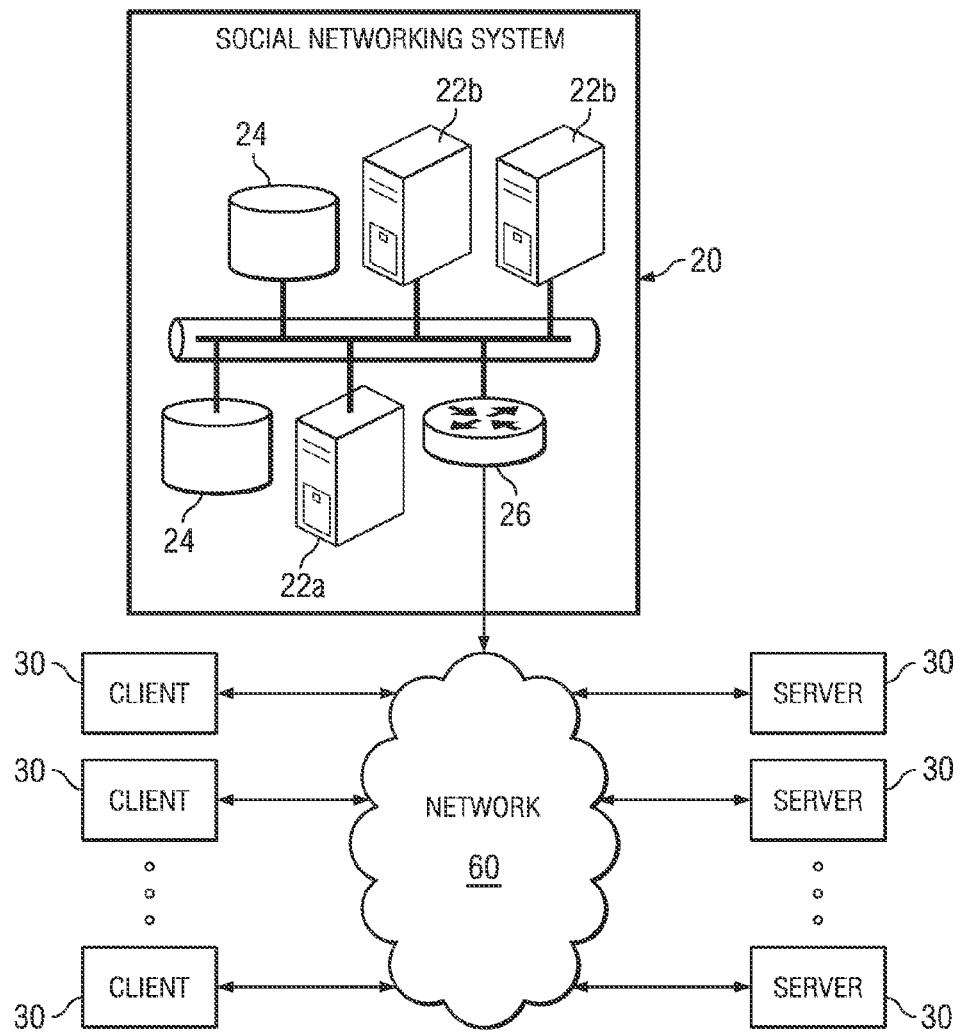
FIG. 3 provides an example network environment.

Particular embodiments may operate in a wide area network environment, such as the Internet, including multiple network addressable systems. FIG. 3 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 3 illustrates, particular embodiments may operate in a network environment comprising social networking system 20 and one or more client devices 30. Client devices 30 are operably connected to the network environment via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, tablet, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to be retrieved, such as resources hosted by social networking system 20. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

Figure 1:
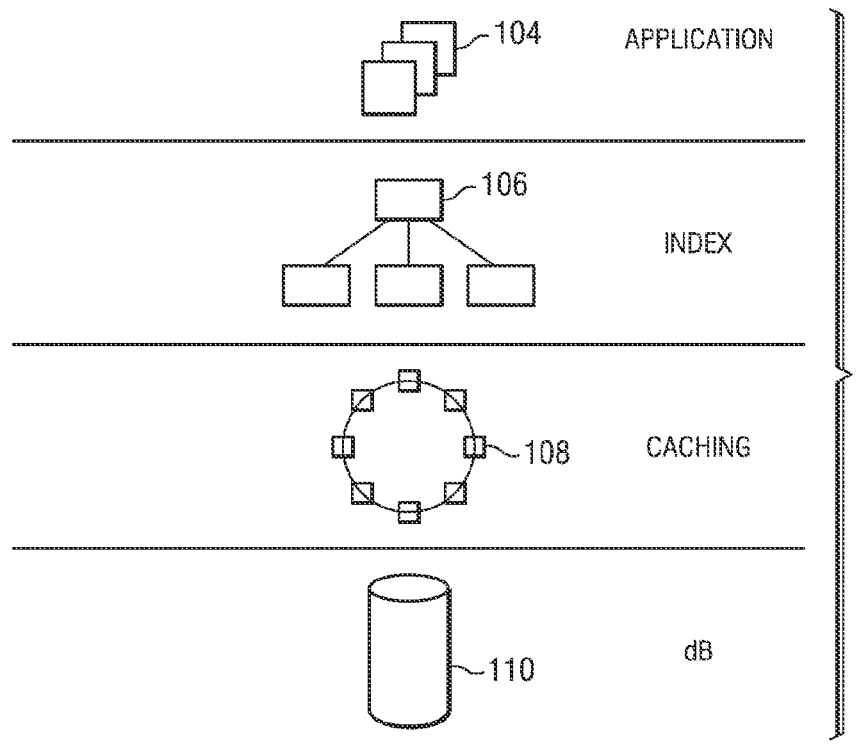
FIG. 1 illustrates an example indexing system architecture according to one implementation of the invention.

FIG. 1 illustrates an example embodiment of a networking system, architecture, or infrastructure 100 (hereinafter referred to as networking system 100) that can implement the back end functions of social networking system 20 illustrated in FIG. 3. In particular embodiments, networking system 100 enables users of networking system 100 to interact with each other via social networking services provided by networking system 100 as well as with third parties. For example, users at remote user computing devices (e.g., personal computers, netbooks, multimedia devices, cellular phones (especially smart phones), etc.) may access networking system 100 via web browsers or other user client applications to access websites, web pages, or web applications hosted or accessible, at least in part, by networking system 100 to view information, store or update information, communicate information, or otherwise interact with other users, third party websites, web pages, or web applications, or other information stored, hosted, or accessible by networking system 100. In particular embodiments, networking system 100 maintains a graph that includes graph nodes representing users, concepts, topics, and other information (data), as well as graph edges that connect or define relationships between graph nodes, as described in more detail below.

With reference to FIG. 1, in particular embodiments, networking system 100 includes a number of client or web servers 104 (hereinafter client servers 104) that communicate information to and from users of networking system 100. For example, users at remote user computing devices may communicate with client servers 104 via load balancers or other suitable systems via any suitable combination of networks and service providers. Client servers 104 may query the index and database systems described herein in order to retrieve data to generate structured documents for responding to user requests. The networking system 100 may also comprise an index layer comprising one or more index servers 106, a cache layer 108 comprising one or more cache servers, and a database layer comprising one or more database servers and associated database management functionality 110. Database 110 generally connotes a database system that may itself include other cache layers for handling other query types.

Each of the client servers 104 communicates a cache layer 108. The cache layer 108 may be implemented as one or more distributed cache clusters or rings. In one implementation, the cache layer 108 is a write-thru/read-thru cache layer, wherein all reads and writes traverse the cache layer. In one implementation, the cache layer maintains association information and, thus, can handle queries for such information. Other queries are passed through to database 110 for execution. In particular embodiments, database 110 is a relational database. Database 110 may be implemented as a MySQL, and/or any suitable relational database management system such as, for example, HAYSTACK, CASSANDRA, among others. In particular embodiments, cache layer 108 may include a plug-in operative to interoperate with any suitable implementation of database 110. In one implementation, a plug-in performs various translation operations, such as translating data stored in the cache layer as graph nodes and edges to queries and commands suitable for a relational database including one or more tables or flat files.

In particular embodiments, information stored by networking system 100 is stored within database 110 and cache layer 108. In particular embodiments, the information stored within each database 110 is stored relationally (e.g., as objects and tables via MySQL), whereas the same information is stored by the cache layer in the form of a graph including graph nodes and associations or connections between nodes (referred to herein as graph edges).

In particular embodiments, each graph node or object is assigned a unique identifier (ID) (hereinafter referred to as node ID) that uniquely identifies the graph node in the graph; that is, each node ID is globally unique. In one implementation, each node ID is a 64-bit identifier. In one implementation, a shard is allocated a segment of the node ID space.

In particular embodiments, the graph can maintain a variety of different node types, such as users, pages, events, wall posts, comments, photographs, videos, background information, concepts, interests and any other element that would be useful to represent as a node. Edge types correspond to associations between the nodes and can include friends, followers, subscribers, fans, likes (or other indications of interest), wallpost, comment, links, suggestions, recommendations, and other types of associations between nodes. In one implementation, a portion of the graph can be a social graph including user nodes that each correspond to a respective user of the social network environment. The social graph may also include other nodes such as concept nodes each devoted or directed to a particular concept as well as topic nodes, which may or may not be ephemeral, each devoted or directed to a particular topic of current interest among users of the social network environment. In particular embodiments, each node has, represents, or is represented by, a corresponding web page ("profile page") hosted or accessible in the social network environment. By way of example, a user node may have a corresponding user profile page in which the corresponding user can add content, make declarations, and otherwise express himself or herself. By way of example, as will be described below, various web pages hosted or accessible in the social network environment such as, for example, user profile pages, concept profile pages, or topic profile pages, enable users to post content, post status updates, post messages, post comments including comments on other posts submitted by the user or other users, declare interests, declare a "like" (described below) towards any of the aforementioned posts as well as pages and specific content, or to otherwise express themselves or perform various actions (hereinafter these and other user actions may be collectively referred to as "posts" or "user actions"). In some embodiments, posting may include linking to, or otherwise referencing additional content, such as media content (e.g., photos, videos, music, text, etc.), uniform resource locators (URLs), and other nodes, via their respective profile pages, other user profile pages, concept profile pages, topic pages, or other web pages or web applications. Such posts, declarations, or actions may then be viewable by the authoring user as well as other users. In particular embodiments, the social graph further includes a plurality of edges that each define or represent a connection between a corresponding pair of nodes in the social graph. As discussed above, each item of content may be a node in the graph linked to other nodes.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, each user has a corresponding "profile" page stored, hosted, or accessible by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

A connection between two users or concepts may represent a defined relationship between users or concepts of the social network environment, and can be defined logically in a suitable data structure of the social network environment as an edge between the nodes corresponding to the users, concepts, events, or other nodes of the social network environment for which the association has been made. As used herein, a "friendship" represents an association, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter or follower of a particular user, web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, a post, a comment, an interest, a link, a piece of media (e.g., photo, photo album, video, song, etc.) a concept, an entity, or a page, among other possibilities (in some implementations a user may indicate or declare a like to or for virtually anything on any page hosted by or accessible by the social network system or environment), that a user, and particularly a registered or authenticated user, has declared or otherwise demonstrated that he or she likes, is a fan of, supports, enjoys, or otherwise has a positive view of. In one embodiment, to indicate or declare a "like" or to indicate or declare that the user is a "fan" of something may be processed and defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein. Additionally, as used herein, an "interest" may refer to a user-declared interest, such as a user-declared interest presented in the user's profile page. As used herein, a "want" may refer to virtually anything that a user wants. As described above, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, an event, in some embodiments, another user (e.g., a non-authenticated user), etc. By way of example, there may be a concept node and concept profile page for "Jerry Rice," the famed professional football player, created and administered by one or more of a plurality of users (e.g., other than Jerry Rice), while the social graph additionally includes a user node and user profile page for Jerry Rice created by and administered by Jerry Rice, himself (or trusted or authorized representatives of Jerry Rice).

In an example graph structure, a data object includes a plurality of attributes. The attributes can be name-value pairs. For example, a data object corresponding to a person may include the following attributes:

```
{
"id": 12345, # 64bit Fbid
"type": person, # can be a type integer or a string name
"created": 1253665137,
"name": "Papa Smurf",
"username": "papa_smurf",
"gender": "male",
"emails": ["psmurf@facebook.com", "papasmurf@gmail.com"]
}
```

The data object identifier (id) may be a 64-bit value that is assigned when the object is created. The attributes of the data object may be parsed and maintained in a search index maintained by one or more index servers 106. For example, when a new data object is created a term producer module may create the following terms from the foregoing data object:

```
type:person
created:1253665137
name:papa
name:smurf
username:papa_smurf
gender:male|
emails:psmurf@facebook.com
emails:papasmurf@gmail.com
```

A document identifier (docid) may include a time stamp (such as a 32-bit counter or clock value) and the data object identifier (id) of a corresponding data object. The terms may be stored in one or more indexes in association with a corresponding docid. For example, in an example search index, docids are generated from the object ID and the "created" timestamp so that all posting lists are ordered reverse chronologically (conceptually, the docids are "created (32 bits):OBid (64 bits)"). The time stamp (created) corresponds to the time when the data object was first created. In other implementations, the time stamp may correspond to the time a given data object was last modified. In one implementation, docids for the index are constructed so that the results of a given search can be ordered reverse chronologically by creation time. For example, based on this scheme, the search, name:smurf type:person, will return all people having the name "smurf", ordered reverse chronologically by the time the data object associated with the person was created. In other embodiments, an arbitrary 32-bit sort key can be used in place of a timestamp, if it is desired to order objects on some other basis.

Associations (edges) between objects may be conceptually modeled and stored as data objects—referred to as "edge objects." Accordingly, the index may store entries corresponding to data objects, such as persons, and other objects that correspond to edge relationships that facilitates searching of social network or other graph-related information, thereby increasing system performance. The following data object corresponds to an association of the type "fan" between the person object above (id 12345) and another data object (id 67890) corresponding to a musical group (Coldplay).

```
{
"id": 92821,
"type": connection.fan,
"created": 1253665248,
"source": 12345, # Papa Smurf
"dest": 67890 # Coldplay
}
```

Edges may generate special terms in the search index associated with the source and destination objects. The search query connection.fan.to(67890), for example, will return the document identifiers associated with all Coldplay (docid 67890) fans. Similarly, the search query connection.fan.from(12345) returns document identifiers for all data objects of which the person (id 12345) has established a fan association. Using this syntax, an application can find all status updates from the friends or other connections of a person with the query: connection.from(12345) type:status As an additional example, the following search query returns all of a person's (id 12345) friends that are also Coldplay fans:
connection.friend.from(12345) connection.fan.to(67890)
Since it is possible to make a data object "point" to another object directly with an attribute, certain types of associations can be created without a separate edge object. For example, instead of having "owner" edge objects between status messages and users, a status object may include an owner attribute with a value of the data object corresponding to the creating user—for example:

```
{
"id": 5834639,
"type": "status.message",
"text": "doing nothing",
"owner": 12345,
}
```

In one implementation, the index servers 106 support a simple syntax for graph traversal through query composition. For example, the following search query will return all of a person's (id 12345) friends-of-friends:
connection.friend.from(connection.friend.from(12345)). In this case, an index server first executes the inner query, connection.friend.from(12345). The document identifiers returned by the inner query are then applied to the outer prefix so that the entire expression expands to an OR of connection.from terms for all of the friends of the person.

This query composition syntax may be used to construct a wide variety of queries. For example, the following search will return all of the photos that have tags identifying friends of the person (id 12345) and in the Stanford network:
connection.tag.from(connection.friend.from(12345)) network:stanford) type:photo. The inner query syntax can be applied to any properties, not just edges. For example, assuming "author" is an attribute of status messages, the following search would return all status messages from friends of the person (id 12345): author(connection.friend.from(12345)) type:status. Additionally, the following search query would return all the status messages from people named Papa: author(name:papa type:person) type: status. Still further, the following search query returns the created friend connections for the person (id 12345) in reverse chronological order: source(connection.friend.from(12345)) type: connection.

The index server 106 returns document identifiers in response to queries, which a client process 104 may use to access corresponding data objects stored in a data store, such as database 110 or cache layer 108. In one implementation, term producer modules, as discussed above, generate terms for the search index from attributes of the data objects. A term producer takes an object as input and outputs a set of (docid, term) pairs indicating what terms should be indexed for that data object. In one implementation, the term producer module type or behavior is chosen based on a type of the object being inserted. For example, assume for didactic purposes that a term producer module has been called to process the following edge object:

```
{
"id": 92821,
"type": "connection.fan",
```

"created": 1253665248,
"source": 12345, # Papa Smurf
"dest": 67890 # Coldplay
}

The connection term producer module may produce the following terms for insertion into the index:

(92821, "type:connection.fan") # Edge document
(92821, "source:12345")
(92821, "dest:67890")
(12345, "connection.fan.to:67890") # Papa Smurf's document
(12345, "connection.to:67890")
(67890, "connection.fan.from:12345") # Coldplay's document
(67890, "connection.from:12345")

Figure 4:
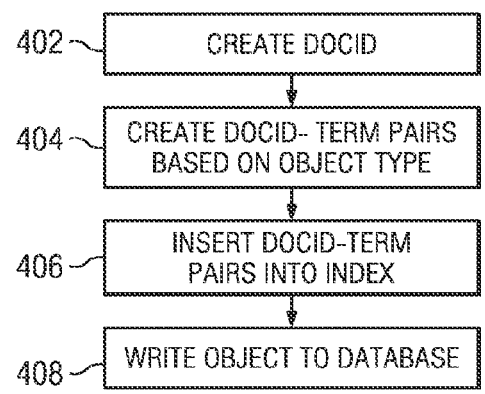
FIG. 4 shows a flowchart illustrating an example method for adding a new object to a graph and composite index.

FIG. 4 sets forth an example method associated with creating new objects and storing them in a system configured according to an implementation of the invention. As FIG. 4 shows, for a new object, a object creation process generates a new document identifier (docid), which may include a created time stamp (created) component and an object identifier component (see above) (402). One or more term producer modules are then invoked to create docid-term pairs based on the type of object (404). The object creation process then inserts the docid-term pairs into one or more indexes maintained by the index servers 106 (406) and writes the object to database 110 (408). In some implementations, each docid-term pair may be maintained as a separate entry in a given index. In other implementations, a docid of a docid-term pair may be added to an existing index entry having the same term. For example, the document identifier of an object (e.g., docid 12345) corresponding to a new fan of Coldplay (docid 67890) may be added to one or more existing index entries having the term "connection.to:67890" and/or "connection.fan.to:67890".

Term producer modules can be updated, and all new objects will index the new terms from the term producer. In addition, an update process may also regenerate the entire index daily in a MapReduce job so that all old objects are updated with new terms. Index rebuilding can be used as a mechanism for improving performance through denormalization. Many storage systems require denormalization of data at the application level to improve performance. Term producers enable denormalization decisions to be made more dynamically and facilitate changes to those decisions as query patterns change. Furthermore, changes to denormalization configurations do not require changes to the way in which the underlying data is persistently stored in database 110. For example, assume that a page generating script (home.php) executes the following search frequently to get status messages from friends: author(connection.from (UID)) type:status. If performance becomes an issue because of query volume and the size of the type:status posting list, a term producer module can be added or updated for status messages to output a composite term of author and type so that the results are in a single, smaller posting list or index. For example, a term producer module can be configured to add additional terms for status objects, such as:

{
"id": 321224,
"type": "status",
"created": 1253665137,
"message": "...",
"author": 12345
}

A term producer module can be updated to output the additional term: (321224, "status:author:12345"). The page generating script can be updated such that the query is expressed as: status:author(connection.from(UID)). In addition, a set of replica indexes can be created for the particular term for further performance improvements, as described in more detail below. One particular advantage of this scheme is that denormalization decisions can easily be changed, and does not need to happen at the application level. This means developers are able to store data in the most conceptually logical way. Query performance can be tuned in a manner relatively independent of these application-level decisions, rendering applications cleaner, easier to understand, and easier to update over time.

In one implementation, the search index is shared by document identifier (docid). For example, as FIG. 1 illustrates, the index layer can be implemented by a hierarchical configuration of index servers including a root server 106a and a plurality of leaf servers 106b. In one implementation, each leaf server 106b is allocated one or more shards. In another implementation, a cluster or ring topology can be used. By default, a search can be executed by sending a query to all shards in parallel, merging the results in the mixer or root index server 106a. In one implementation, a shard is allocated a segment of the document identifier space. In particular embodiments, each document identifier (docid) maps (e.g., arithmetically or via come mathematical function) to a unique corresponding shard ID. Accordingly, a particular term (e.g., "connection.fan.from:12345") may be maintained in one shard to which the object Coldplay (docid 67890) corresponds and other shards corresponding to other objects that the person (docid12345) has also established a "fan" connection. In one implementation, each of the index servers 106 is allocated a set of shard IDs for which they are responsible to maintain. This allocation can be adjusted to add or remove index servers 106 from the system.

Sending all queries to all shards may be computationally expensive and may limit the overall query rate of the system. In one implementation, the index layer implemented by the index servers 106 supports special replica indexes that only index a subset of the terms in the index system. For example, in addition to a main or master index, the index layer may include one or more additional replica index that are adapted for one or more specific query types. For example, assume that the query connection.from(*) is an extremely common query within the system. The indexing system described herein can be configured such that all connection.from terms are replicated in an additional replica index that only contains those terms. The following command illustrates an example application programming interface that allows for creation of such replica indexes.

replicas = {
"connection.from:*": [...], # Devoted connection replica
"email:*": [...], # Email search replica
"*": [...], # Main replicas
}

When an index server 106 executes a query, it chooses the smallest replica index that can satisfy the search. For example, the query connection.from(12345) will be forwarded to an index server that is devoted to the connection-.from replica index. On the other hand, a more generic or broader search, such as connection.from(12345) type:page, will be executed on the main index or another replica that supports both terms. However, there is no theoretical reason against sharing by term to improve performance for certain queries. An advantage of this design is that the system can support all queries and be tuned for optimal throughput and performance for the most important queries. Once a query becomes common enough, an administrator may tune the system to increase query rate by creating a set of replicas devoted to satisfying that class of query. This simplifies application development in that a network application can first be configured to perform whatever queries it requires. Prior to launching the application, replica indexes can be created to improve performance based on the structure of the queries created during application development.

Figure 2:
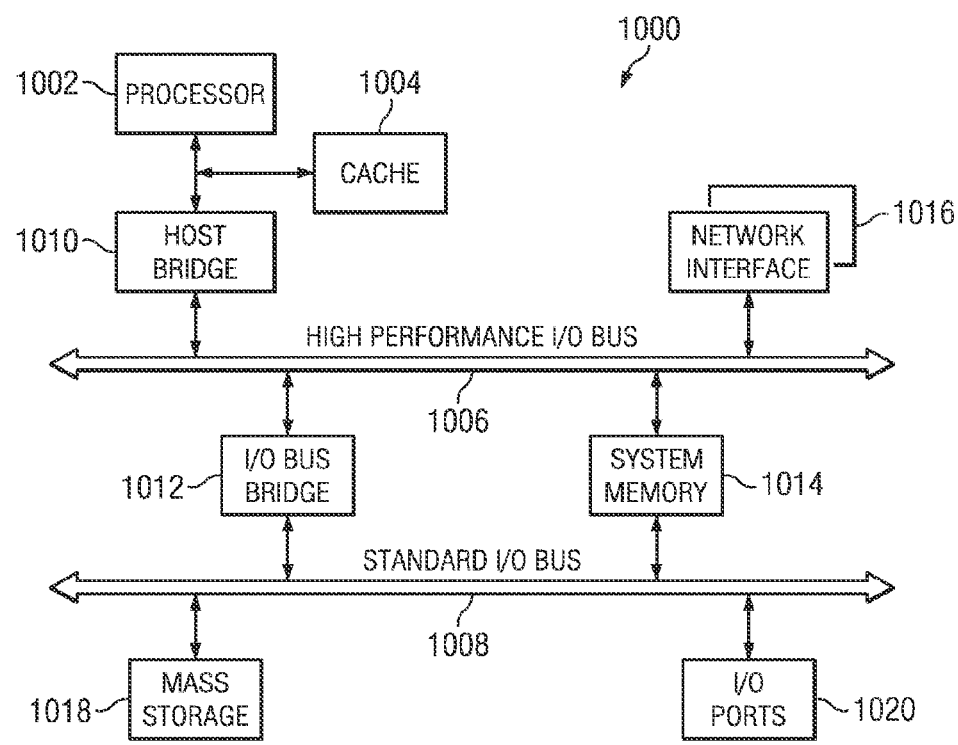
FIG. 2 illustrates an example computer system architecture.

FIG. 2 illustrates an example computing system architecture, which may be used to implement a server 22a, 22b. In one embodiment, hardware system 1000 comprises a processor 1002, a cache memory 1004, and one or more executable modules and drivers, stored on a tangible computer readable medium, directed to the functions described herein. Additionally, hardware system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network/communication interfaces 1016 couple to bus 1006. Hardware system 1000 may further include video memory (not shown) and a display device coupled to the video memory. Mass storage 1018, and I/O ports 1020 couple to bus 1008. Hardware system 1000 may optionally include a keyboard and pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, etc. Mass storage 1018 provides permanent storage for the data and programming instructions to perform the above-described functions implemented in the servers 22a, 22b, whereas system memory 1014 (e.g., DRAM) provides temporary storage for the data and programming instructions when executed by processor 1002. I/O ports 620 are one or more serial and/or parallel communication ports that provide communication between additional peripheral devices, which may be coupled to hardware system 1000.

Hardware system 1000 may include a variety of system architectures; and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present invention may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

In one implementation, the operations of the embodiments described herein are implemented as a series of executable modules run by hardware system 1000, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1002. Initially, the series of instructions may be stored on a storage device, such as mass storage 1018. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1016. The instructions are copied from the storage device, such as mass storage 1018, into memory 1014 and then accessed and executed by processor 1002.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications and models data as a graph of associations. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising, by one or more index servers of an online social network:
   receiving, from a client server of the online social network, a search query comprising an inner query and an outer query, the inner query comprising a first edge-type term and a first object identifier, and the outer query comprising a second edge-type term and a second object identifier;
   executing the inner query by identifying a first set of node objects, each node object in the first set being a source node of one or more first edge objects of an edge type specified by the first edge-type term, each of the one or more edge objects having a destination node corresponding to the first object identifier;
   executing the outer query by identifying a second set of nodes objects, each node in the second set being a source node of one or more second edge objects of an edge type specified by the second edge-type term, each of the one or more edge object having a destination node corresponding to one of the node objects in the first set; and
   sending, to the client server, second object identifiers of one or more node objects in the second set.

2. The method of claim 1, wherein the executing of the inner query comprises:
   identifying the one or more first edge objects associated with the inner query having the edge type specified by the first edge-type term and having the destination node corresponding to the first object identifier; and
   identifying the first set of node objects that are the source nodes of the one or more first edge objects.

3. The method of claim 2, wherein the executing of the outer query comprises:
   identifying the one or more second edge objects associated with the outer query having the edge type specified by the second edge-type term and having the destination node corresponding to one of the node objects in the first set;
   identifying the second set of node objects that are source nodes of the one or more second edge objects; and
   identifying the second object identifiers of the one or more node objects in the second set.

4. The method of claim 1, wherein the inner query further comprises a node attribute.

5. The method of claim 4, wherein the executing of the inner query further comprises:
   filtering the first set of node objects by the node attribute to identify a third set of node objects comprising one or more nodes associated with the node attribute.

6. The method of claim 5, wherein the executing of the outer query further comprises:
   identifying the second set of nodes objects in which each node in the second set is a source node of the one or more second edge objects of the edge type specified by the second edge-type term and each of the one or more edge object has a destination node corresponding to one of the node objects in the third set of node objects.

7. The method of claim 1, further comprising, prior to executing the inner query:
   accessing, at the one or more index servers, one or more indexes associated with the online social network, each index comprising one or more data objects, the data objects comprising the one or more node objects and the one or more edge objects.

8. The method of claim 7, wherein the second object identifiers of the one or more node objects in the second set comprise a time stamp and a data object identifier associated with the one or more node objects.

9. The method of claim 8, wherein the time stamp comprises to one or more of:
   a time when the node object was first created; and
   a time when the node object was last modified.

10. The method of claim 9, wherein the one or more nodes objects of the second set are ordered by reverse chronological order based on the time when the node object was created.

11. The method of claim 9, wherein the one or more nodes objects of the second set are ordered by reverse chronological order based on the time when the node object was last modified.

12. The method of claim 1, wherein the first edge-type term and the second edge type term each defines a type of association between a source node object and a destination node object.

13. The method of claim 12, wherein the type of association between the source node object and the destination node object is determined based on a social graph of the online social network, the social graph comprising a plurality of nodes and a plurality of edges connecting the nodes, each of the edges between two of the nodes representing a single degree of separation between them, the nodes comprising a plurality of user nodes and a plurality of concept nodes; and
   wherein each of the plurality of nodes corresponds to one or more node objects, and each of the plurality of edges corresponds to one or more edge objects.

14. The method of claim 13, wherein each node object has a node object identifier and a node object type.

15. The method of claim 14, wherein each edge object has an edge-object identifier, an edge-object type, an edge-object source identifier, and an edge-object destination identifier.

16. The method of claim 15, wherein identifying the second set of node objects comprises determining one or more node objects that each have a node-object identifier that matches an edge-object source identifier of an edge object of the first edge objects.

17. The method of claim 1, wherein the client server uses the object identifiers of the node objects of the second set to access corresponding data objects stored in a data store of the online social network.

18. The method of claim 17, wherein the corresponding data objects are inputted to a term producer module to generate one or more terms associated with the data object.

19. One or more computer-readable non-transitory storage media embodying software that is operable when executed to:
   receive, from a client server of the online social network, a search query comprising an inner query and an outer query, the inner query comprising a first edge-type term and a first object identifier, and the outer query comprising a second edge-type term and a second object identifier;

execute the inner query by identifying a first set of node objects, each node object in the first set being a source node of one or more edge objects of an edge type specified by the first edge-type term, each of the one or more edge objects having a destination node corresponding to the first object identifier;

execute the outer query by identifying a second set of nodes objects, each node in the second set being a source node of one or more edge objects of an edge type specified by the second edge-type term, each of the one or more edge object having a destination node corresponding to one of the node objects in the first set; and send, to the client server, object identifiers of one or more node objects in the second set.

20. A system comprising: one or more processors; and a non-transitory memory coupled to the processors comprising instructions executable by the processors, the processors operable when executing the instructions to:

receive, from a client server of the online social network, a search query comprising an inner query and an outer query, the inner query comprising a first edge-type term and a first object identifier, and the outer query comprising a second edge-type term and a second object identifier;

execute the inner query by identifying a first set of node objects, each node object in the first set being a source node of one or more edge objects of an edge type specified by the first edge-type term, each of the one or more edge objects having a destination node corresponding to the first object identifier;

execute the outer query by identifying a second set of nodes objects, each node in the second set being a source node of one or more edge objects of an edge type specified by the second edge-type term, each of the one or more edge object having a destination node corresponding to one of the node objects in the first set; and send, to the client server, object identifiers of one or more node objects in the second set.

* * * * *